United States Patent
Ansems et al.

[19]

[11] Patent Number: 5,803,575
[45] Date of Patent: Sep. 8, 1998

[54] LIGHT GENERATOR FOR INTRODUCING LIGHT INTO OPTICAL FIBERS

[75] Inventors: Johan Ansems, Hulsel, Netherlands; Pierre Dufresne, La Ferte St Aubin; Antonio Hernandez, Theillay, both of France

[73] Assignee: U.S. Philips Corporation, New York, N.Y.

[21] Appl. No.: 616,422

[22] Filed: Mar. 15, 1996

[30] Foreign Application Priority Data

Mar. 22, 1995 [FR] France .................................. 95 03351

[51] Int. Cl.⁶ ..................................................... F21V 7/04
[52] U.S. Cl. ................................ 362/32; 385/53; 385/76; 385/77; 385/78; 385/84; 385/88; 385/92; 385/93
[58] Field of Search ............................... 362/32; 385/53, 385/76, 77, 78, 79, 80, 81, 83, 84, 85, 88, 92, 93, 94, 115, 116, 119, 33, 61

[56] References Cited

U.S. PATENT DOCUMENTS

| | | |
|---|---|---|
| 3,198,059 | 8/1965 | Phaneuf et al. . |
| 4,732,452 | 3/1988 | Carter ..................................... 350/96.21 |
| 4,770,486 | 9/1988 | Wang et al. .............................. 350/96.2 |
| 4,776,667 | 10/1988 | Yoshida et al. ........................ 350/96.25 |
| 4,825,341 | 4/1989 | Awai .......................................... 362/32 |
| 5,036,834 | 8/1991 | Sugiyama et al. ............................ 128/6 |
| 5,051,872 | 9/1991 | Anderson ..................................... 362/32 |
| 5,099,399 | 3/1992 | Miller et al. ................................. 362/32 |
| 5,412,750 | 5/1995 | Nath ......................................... 385/125 |
| 5,463,709 | 10/1995 | Terao et al. ................................. 385/85 |
| 5,513,291 | 4/1996 | Buchin et al. ............................... 385/93 |
| 5,590,228 | 12/1996 | Gibola et al. ............................... 385/56 |

FOREIGN PATENT DOCUMENTS

| | | | |
|---|---|---|---|
| 0082691B1 | 12/1982 | European Pat. Off. .......... G02B 6/04 |
| 2 684 431 | 6/1993 | France ...................................... 362/32 |
| 59-219715 | 12/1984 | Japan . |

*Primary Examiner*—Ira S. Lazarus
*Assistant Examiner*—Ljiljana V. Ciric
*Attorney, Agent, or Firm*—F. Brice Faller

[57] ABSTRACT

A generator comprises a lamp (1), an optical unit (2–3) which concentrates the light around an axial image point (5), a ferrule for an optical-fiber bundle, comprising a cylindrical part (7) which, on the one hand, retains the end of the optical-fiber bundle and, on the other hand, surrounds a transparent rod (12) which is brought into contact with the end of the optical-fiber bundle. The end of the transparent rod (12) facing the optical unit and the lamp has a concave surface, the axial image point (5) around which said optical unit concentrates the light is a virtual image point situated inside said rod, and the end of the fiber bundle (6) is polished and brought into contact with the transparent rod (12) by any suitable mechanical means.

16 Claims, 1 Drawing Sheet

LIGHT GENERATOR FOR INTRODUCING LIGHT INTO OPTICAL FIBERS

BACKGROUND OF THE INVENTION

The invention relates to a light generator for introducing light into a bundle of optical fibers, which light generator comprises a lamp, an optical unit for concentrating light around an axial image point, a ferrule for an optical-fiber bundle, comprising a cylindrical part which, on the one hand, holds the end portion of the optical-fiber bundle and, on the other hand, surrounds a transparent rod which is in contact with the end of the optical-fiber bundle.

The invention also relates to a method of manufacturing said ferrule for the end portion of the optical-fiber bundle of a light generator.

Such a generator is used for decorative illumination purposes, in particular, to show exhibits in a museum, architectural elements, articles in a shop window etc, to good advantage.

A generator of the type described in the opening paragraph is disclosed in EP-A-0 082 691. This document describes means of obtaining a uniform light distribution over the surface of the fiber bundle with the lowest possible light loss.

SUMMARY OF THE INVENTION

It is an object of the invention to further reduce the light loss.

In accordance with the invention this object is achieved by means of a generator in of the above type, which is characterized in that the end of the transparent rod facing the optical unit and the lamp has a concave surface and the axial image point around which the optical unit concentrates the light is a virtual image point which is situated inside said rod.

Thus, the invention is based on the idea of dividing the light-concentration effect between the optical unit itself and the glass rod, which enables light beams which are practically parallel to the longitudinal axis of the fiber bundle to be obtained at the input of the optical fibers, resulting in lower light losses.

A generator in accordance with the invention has the additional advantage that said parallelism of the light beams is less dependent upon the wavelength of the light.

Given that the concave surface of the material of the rod forms an optical interface with air, whose virtual object focus is in the interior of said rod, the output can be optimized in that the axial point around which the optical unit concentrates the light substantially coincides with said virtual focus.

In a particular embodiment, the lamp is a high-pressure, metal-iodide lamp.

This type of burner forms a light source of very small dimensions which makes the best possible use of the optical characteristics of the generator.

Advantageously, said burner is included in a demountable assembly provided with positioning means.

Thus, the lamp can be replaced by people who are not skilled in the art, without running the risk that the positioning accuracy of the lamp is adversely affected.

In another particular embodiment, the cylindrical member which holds the end of the optical-fiber bundle and surrounds a transparent rod comprises at least two parts which are coupled to each other, one of said parts holding the end of the optical-fiber bundle and the other part containing the transparent rod.

Advantageously, the part which holds the end of the optical-fiber bundle is a sleeve provided with an exterior neck portion in which a C-clip is mounted, one end portion of said sleeve being inserted into the part containing the transparent rod, said latter part itself being connected to a tube which surrounds the other end portion of the sleeve, and said C-clip being confined between the part containing the transparent rod and said tube.

Advantageously, the generator is accommodated in a housing and comprises a pulsated-air cooling system in which the pulsated air which enters the housing first contacts the ferrule of the optical fiber bundle.

Thus, cooling of the point where the fibers enter, which usually gets overheated, is improved.

To facilitate the operation of the generator, the generator is advantageously provided with means for fixing the ferrule of the fiber bundle, so that said ferrule can be removed from outside the housing.

Maintenance mechanics burn themselves workers are prevented from burning by, the assembly of the lamp and the optical elements which advantageously ensures that, in the absence of the ferrule of the fiber bundle, the light is concentrated in a point situated inside the housing.

A method of manufacturing the ferrule holding the end of the bundle of optical fibers of a light generator in accordance with the invention is characterized in that:

fibers are used which expand when they are heated, a fiber bundle is inserted into a sleeve first, the sleeve is heated, the end of the sleeve and of the fibers which it contains are cut off and the cut surface thus obtained is first polished and then subjected to an optical treatment, and the end of the sleeve and the end of a transparent rod are interconnected by any suitable mechanical the means.

These and other aspects of the invention will be apparent from and elucidated with reference to the embodiments described hereinafter.

DETAILED DESCRIPTION OF THE PREFERRED EMBODIMENTS

Figure 1:
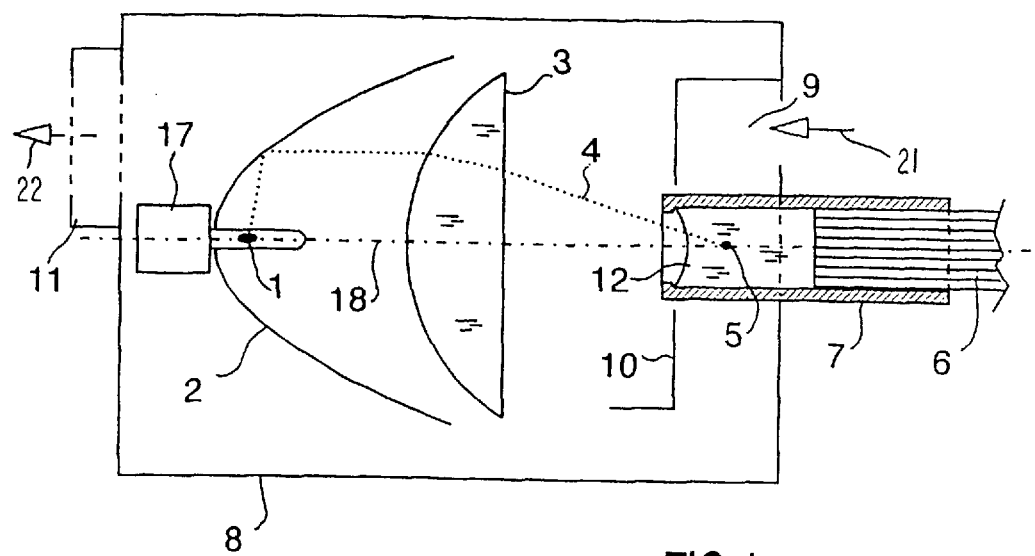
FIG. 1 is a schematic, sectional view of a light generator which supplies light to an optical-fiber bundle.

The light generator shown in FIG. 1 introduces light into an optical fiber bundle schematically shown in 6. The parts supplying light have a rotational symmetry around an axis 18. This generator comprises a lamp, with a light-emission point 1, and an optical unit in the form of a parabolic mirror 2 and a plane-convex lens 3 whose convex surface is directed towards the lamp 1.

This lamp is high-pressure metal-iodide lamp. In this case, the use of such a lamp very suitable because its light source has very small dimensions, so that a higher optical precision can be attained. For example, now such a lamp manufactured, and having a very small arc length, provides a luminous flux of approximately 6,000 lumens and has a power consumption of 100 W. In this embodiment lamp incorporated in an assembly 17, which is demountable and which is in the form of a cassette provided with means for positioning the assembly with respect to the optical unit, and is provided with solid contact terminals or flexible electrical conductors having connector pins. These positioning means, not shown, include (lugs and screws, clips and grooves, guides, etc). In a different embodiment, the lamp 1 and the reflector 2 may alternatively be manufactured as an integral body, in which case the lamp and its reflector are integrally replaced at the end of the life of the lamp.

One of the light beams 4 emitted by the lamp and coincides with the axis 18 of axial point 5. Consequently, the optical unit concentrates the light around the axial point 5. Strictly speaking, this axial point 5 is not a focusing point because the beams which have first been reflected by the mirror 2, such as the beam 4, and the direct beams do not converge exactly in the same point. Nevertheless, point 5 is an axial point of maximal concentration of the light via the unit 2–3. Moreover, instead of being parabolic, the mirror 2 could be spherical, at least partially, with the light source 1 in the center of said spherical part, so that the reflected light travels in the same direction, at the level of the lens 3, as the light originating directly from the lamp. In a different embodiment, it is alternatively possible to provide only an elliptic mirror, i.e. the lens is omitted. However, this would be more difficult to achieve as it would require a greater mechanical precision.

The end portion of the optical-fiber bundle is held in a ferrule. This ferrule comprises a cylindrical part, schematically shown and bearing reference numeral 7, which, on the one hand, holds the end portion of the optical-fiber bundle 6 and keeps it fixed in position, and, on the other hand, surrounds a transparent rod 12, which is preferably made of glass, whose end, shown on the right in the Figure, is planar and brought into contact with the end of the optical-fiber bundle 6.

The other end of the rod 12, shown on the left in the Figure, which faces the optical unit 2–3 and the lamp, has a concave surface and the virtual axial point 5 around which the optical unit concentrates the light is situated inside said rod. For the abovementioned lamp, use is for example made of a fiber bundle having a diameter of 12 mm, which includes 114 fibers which each have a diameter of 1 mm and which are made from "PMMA" (polymethacrylate), and which are surrounded by a sheath made from a mixture of glass fiber and silicone.

The generator is accommodated in a housing 8 and comprises a cooling system on the basis of pulsated air, in which the air is extracted from the housing by a fan 11 as shown by arrows 21 and 22. This air enters the housing via an entrance 9 and is then guided by a sleeve 10 which makes sure that the air first contacts the ferrule 7 of the optical-fiber bundle. The lamp is energized by a special electric power unit, which is known per se and which does not form part of the invention, which power unit can advantageously be accommodated in the interior of the housing of the generator and cooled simultaneously with the lamp and the ferrule.

The housing is provided with means for fixing the ferrule 7 of the optical-fiber bundle, so that said ferrule can be removed from outside the housing. A number of different positioning means, not shown, are available to those skilled in the art (such as lugs and screws, a sleeve having a resilient cone, which holds the tube from the outside, a sleeve provided with balls, in which the tube, which is provided with grooves, cannot move in the longitudinal direction because the balls enter the grooves, screwing with a thread situated outside the ferrule, fixing by means of springs, etc).

The point 5 around which the assembly of the lamp and the optical elements concentrate the light is situated, in the absence of the ferrule of the optical-fibre bundle, inside the housing 8. Thus, burns are avoided in case the ferrule 7 is demounted when the generator is ignited.

Figure 2:
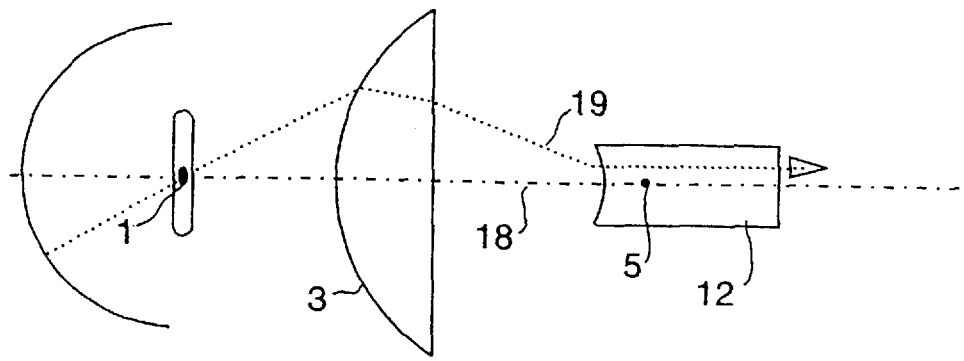
FIG. 2 is an optical diagram which shows how light is concentrated in optical fibers.

The above description, which explains how the light is concentrated around the axial point 5, applies to a situation in which the rod 12 is absent. If the rod is present, the trajectory of the light beams is shown in FIG. 2. As an illustration of one of the above-mentioned variants, the mirror used has a spherical shape and the lamp is rotated through 90°. The light beam 19 originating from the source 1 is deflected downwards in the direction of the axis by the lens 3, is incident on the input surface of the rod 12 and, subsequently, reaches the symmetry axis. The concave surface of the rod material forms an optical interface with air, the virtual object focus of said interface being situated at point 5 inside the rod, and the axial point around which the optical unit concentrated the light in the absence of said rod, practically coincides with said virtual focus. Consequently, the light beam does not pass through point 5 (for this reason the latter is referred to as "virtual" focus) and is diffracted by the concave interface so as to become parallel to the axis 18 and enter the optical fibers in proper axial alignment.

The structure described hereinabove enables a generator to introduce more than 50% of the luminous flux emitted by the lamp into the fiber bundle.

Figure 3:
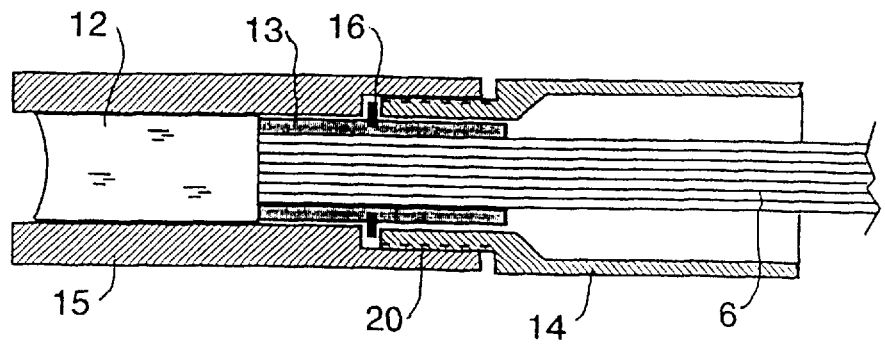
FIG. 3 is a detailed, sectional view of an embodiment of a cylindrical element which is used, on the one hand, to hold the end of an optical-fiber bundle and, on the other hand, to surround a transparent rod.

The cylindrical element which holds the end of the bundle and surrounds a transparent rod is shown in greater detail in FIG. 3. This cylindrical element comprises at least two parts, in this case three parts, which are coupled to each other, one part holding the end of the fiber bundle and an other part accommodating the transparent rod. The part which holds the end of the bundle 6 is a sleeve 13 provided with an external annular neck portion in which a C-clip 16 is provided. One end of said sleeve 13, shown on the left in the Figure, is inserted into a cylindrical part 15 comprising the transparent rod 12. This part 15 is coupled, in this case by means of a threaded sleeve 20, to a tube 14 which surrounds the other end of the sleeve 13, shown on the right in the Figure, and the C-clip 16 is confined between the part 15, comprising the transparent rod, and the tube 14. The parts 13, 14, 15 are for example made of aluminum.

The ferrule holding the end of the optical-fiber bundle of a light generator is manufactured as follows:

the fibers employed expand upon exposure to heat, the end of a fiber bundle is introduced into a sleeve 13 in such a manner that it projects slightly beyond the sleeve, the sleeve comprising the fibers is heated, the end of the sleeve comprising the fibers is cut off and the cut surface is polished, cleaned and, finally, subjected to a known optical treatment, the sleeve is necked so that the fibers are retained even better, the sleeve is passed through the tube 14, the sleeve being introduced into the tube from the right-hand side if the tube is positioned as shown in FIG. 3, subsequently the C-clip 16 is provided and so that the sleeve 13 can no longer pass through said tube 14, the cylindrical part 15 comprising the rod 12 is screwed to the tube 14.

We claim:

1. A light generator for introducing light into a bundle of optical fibers, which light generator comprises an assembly of a lamp, an optical unit for concentrating light from said lamp around an axial image point, and a ferrule for said optical-fiber bundle, said ferrule comprising a cylindrical part which holds an end of the optical-fiber bundle and surrounds a transparent rod having a first end which is in contact with the end of the optical-fiber bundle and a second end which faces the optical unit and the lamp, characterized in that the end of the transparent rod facing the optical unit and the lamp has a concave surface, that the end of the rod contacting the optical-fiber bundle is planar, and that the axial image point around which the optical unit concentrates the light is a virtual image which is situated inside said rod.

2. A light generator as claimed in claim 1, characterized in that, as the concave surface of the material of the rod forms a an optical interface with air, whose virtual object focus is in the interior of said rod, the axial point around which the optical unit concentrates the light substantially coincides with said virtual focus.

3. A light generator as claimed in claim 2, characterized in that the lamp is a high-pressure metal-iodide lamp.

4. A light generator as claimed in claim 3, characterized in that the lamp is included in a removable assembly provided with positioning means for positioning the assembly relative to the optical unit.

5. A light generator as claimed in claim 4, characterized in that the cylindrical part which holds the end of the optical-fiber bundle and surrounds the transparent rod comprises at least two portions which are coupled to each other, one of said portions holding the end of the optical-fiber bundle and the other portion containing the transparent rod.

6. A light generator as claimed in claim 5, characterized in that the portion which holds the end of the optical-fiber bundle is a sleeve provided with an exterior neck: section in which a C-clip is mounted, one end of said sleeve being inserted into the portion containing the transparent rod, said portion containing the transparent rod itself being connected to a tube which surrounds the other end of the sleeve, and said C-clip being confined between the portion containing the transparent rod and said tube.

7. A light generator as claimed in claim 6, characterized in that said generator is accommodated in a housing and comprises a pulsated-air cooling system which the pulsated air entering the housing and first contacts the ferrule of the optical fiber bundle.

8. A light generator as claimed in claim 7, characterized in that said generator is accommodated in a housing provided with means for removably attaching the ferrule of the fiber bundle to the housing in a manner such that said ferrule is removable from outside the housing.

9. A light generator as claimed in claim 8 characterized in that the assembly of the lamp and the optical unit is such that, before entering the rod, light rays from said lamp directed to a point situated inside the housing.

10. A light generator as claimed in claim 1, characterized in that the lamp is a high-pressure metal-iodide lamp.

11. A light generator as claimed in claim 1, characterized in that the lamp is included in a removable assembly provided with positioning means.

12. A light generator as claimed in claim 1, characterized in that the cylindrical part which holds the end of the optical-fiber bundle and surrounds a transparent rod comprises at least two portions which are coupled to each other, one of said portions holding the end of the optical-fiber bundle and the other portions containing the transparent rod.

13. A light generator as claimed in claim 1, characterized in that said generator is accommodated in a housing and comprises a pulsated-air cooling system in which pulsated air entering the housing first contacts the ferrule of the optical fiber bundle.

14. A light generator as claimed in claim 1, characterized in that said generator is accommodated in a housing and provided with means for fixing the ferrule of the fiber bundle, so that said ferrule can be removed from outside the housing.

15. A light generator as claimed in claim 1, characterized in that the assembly of the lamp and the optical unit ensures that, in the absence of the ferrule of the fiber bundle, the light is concentrated in a point situated inside the housing.

16. A light generator as claimed in claim 1 characterized in that the assembly of the lamp also comprises a housing and the optical unit is such that, before entering the rod, light rays from said lamp directed to a point situated inside the housing.

* * * * *